United States Patent
Kuhlhoff et al.

(10) Patent No.: US 10,871,253 B2
(45) Date of Patent: Dec. 22, 2020

(54) COUPLING FITTING FOR PIPES

(71) Applicant: ContiTech MGW GmbH, Hannoversch Muenden (DE)

(72) Inventors: Florian Kuhlhoff, Hamburg (DE); Simon Kaschka, Norderstedt (DE); Henry Antoniak, Garbsen (DE)

(73) Assignee: ContiTech MGW GmbH, Hannoversch Muenden (DE)

( * ) Notice: Subject to any disclaimer, the term of this patent is extended or adjusted under 35 U.S.C. 154(b) by 349 days.

(21) Appl. No.: 15/872,760

(22) Filed: Jan. 16, 2018

(65) Prior Publication Data
US 2018/0141249 A1 May 24, 2018

Related U.S. Application Data

(63) Continuation of application No. PCT/EP2016/054500, filed on Mar. 3, 2016.

(30) Foreign Application Priority Data

Jul. 15, 2015 (DE) .................. 10 2015 213 223

(51) Int. Cl.
| | | |
|---|---|---|
| F16L 47/12 | (2006.01) | |
| F16L 13/11 | (2006.01) | |
| F16L 47/20 | (2006.01) | |
| F16L 21/08 | (2006.01) | |
| B29C 45/14 | (2006.01) | |

(52) U.S. Cl.
CPC .............. F16L 47/12 (2013.01); F16L 13/116 (2013.01); F16L 21/08 (2013.01); F16L 47/20 (2013.01); B29C 45/14311 (2013.01); B29C 45/14614 (2013.01)

(58) Field of Classification Search
CPC ......... F16L 47/12; F16L 47/20; F16L 47/065; F16L 13/116; F16L 17/02; F16L 21/02; F16L 21/08; B29C 45/14614; B29C 45/14311
USPC .................................................. 285/374, 399
See application file for complete search history.

(56) References Cited

U.S. PATENT DOCUMENTS

| | | | | |
|---|---|---|---|---|
| 4,648,633 | A | * | 3/1987 | Bergmann .............. F16L 21/08 |
| 7,758,086 | B2 | * | 7/2010 | Slunick ......................... 285/374 |
| 2012/0043752 | A1 | * | 2/2012 | McPherson ........... F16L 13/116 |

(Continued)

FOREIGN PATENT DOCUMENTS

| | | |
|---|---|---|
| EP | 0531709 A2 | 3/1993 |
| EP | 0768490 A1 | 4/1997 |
| WO | 2004018176 A1 | 3/2004 |

OTHER PUBLICATIONS

Internationl Search Report dated May 23, 2016 of international application PCT/EP2016/054500 on which this application is based.

*Primary Examiner* — Zachary T Dragicevich
(74) *Attorney, Agent, or Firm* — Gregory Adams; David Cate

(57) ABSTRACT

A coupling fitting comprises a pipeline and a connector sleeve. The pipeline and connector sleeve are each separate parts and are fixedly and non-detachably connected to one another by a connecting ring which can be produced in situ by injection molding plastics material. The invention is also directed to a method for making the coupling fitting.

7 Claims, 1 Drawing Sheet

(56) References Cited

U.S. PATENT DOCUMENTS

2015/0345684 A1* 12/2015 Kujawski, Jr. .......... F16L 21/08
2016/0053924 A1*  2/2016 Hoehn ................... F16L 21/08

* cited by examiner

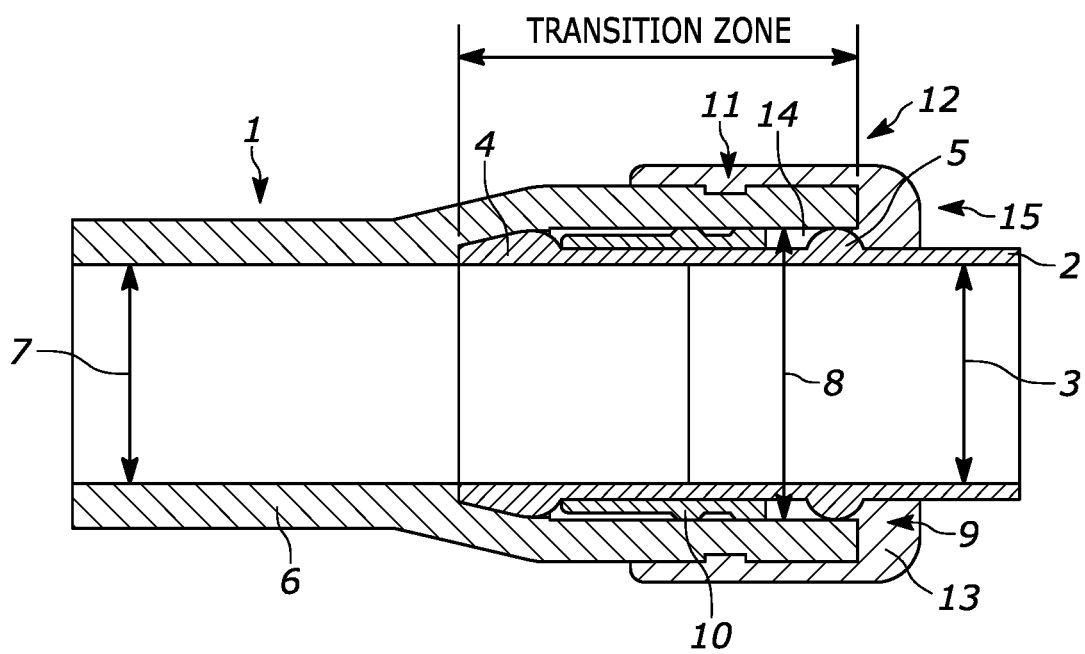

COUPLING FITTING FOR PIPES

CROSS REFERENCE TO RELATED APPLICATIONS

This application is a continuation application of international patent application PCT/EP2016/054500, filed Mar. 3, 2016, designating the United States and claiming priority from German application 10 2015 213 223.4, filed Jul. 15, 2015, and the entire content of both applications is incorporated herein by reference.

FIELD OF THE INVENTION

The invention relates to a coupling fitting, having a pipeline and having a connector sleeve.

BACKGROUND OF THE INVENTION

Coupling fittings have long been known and used. A problem in the case of such fittings may be that the fitting, especially in the case of plug-in connections, must have particular profiles which must be integrally formed on, or attached in fluid-tight fashion in some other way to, the affected end of the line. In particular in the case of metallic pipelines, it is common practice for such coupling fittings to be attached by brazing. This is however associated with a certain degree of effort and corresponding costs. Furthermore, the high temperatures that arise during the brazing process can undesirably adversely affect adjoining components.

This problem can be circumvented if use is made of fittings composed of plastic, which may for example be adhesively bonded on or else produced in situ by an injection molding process.

EP 0531709 B1 presents a fitting of this type which is injection-molded onto the end of a pipeline composed of plastic. Here, the entire connector part is produced as an injection molding. Thus, a relatively large volume of material is required, which leads inter alia to increased cooling times. WO 2004/018176 A1 likewise discloses a fitting of the type discussed in the introduction. In this case, the plastics pipeline is cohesively connected, by an injection molding process using a plastic, to a connector sleeve which is likewise composed of plastic and which is fitted onto the pipe.

This principle however functions only with materials which, under the thermal conditions in the injection molding process, fuse together with the injection-molded material at least at the surfaces. This greatly restricts the material selection; for example, it is thus not possible to use metallic pipelines. Also, extremely exact process control must be ensured, because otherwise there is the risk of leaks forming.

SUMMARY OF THE INVENTION

It is an object of the invention to provide a coupling fitting of the type discussed above such that, with the broadest possible range of usable materials and the least possible material usage, the fitting can be securely and sealingly connected to the pipeline, wherein undesired thermal loading of the components involved and of adjacent components can be avoided.

The object is achieved in that the fitting has the following features:

a radially outwardly directed, encircling bead which is spaced apart from the end of the pipeline by a predetermined dimension;

a connector sleeve which is pushed onto the pipeline, the first end of which connector sleeve is arranged in the region of the bead of the pipeline and has a first inner diameter such that a gap is present between the outer diameter of the bead and the first inner diameter of the sleeve, and the second end of which connector sleeve has a second inner diameter which corresponds to the inner diameter of the pipeline, and the first diameter transitions into the second diameter in a transition region between the bead and the end of the pipeline, such that the sleeve can be pushed onto the end of the pipeline only as far as a point at which the end of the pipeline fits no further into the second diameter of the sleeve;

an elastic annular seal, which is arranged both between the end of the pipeline and the bead as well as between the pushed-on sleeve and the pipeline;

a connecting ring which is arranged in a region which is axially dimensioned such that it covers the pushed-on first end of the sleeve both in the direction of the non-pushed-on second end of the sleeve and in the opposite direction by a predetermined dimension and can be produced in a plastics injection-molding process, wherein the plastics material of the connecting ring can, owing to the injection pressure, be pre-pressed through the gap as far as the elastic seal and, secondly, the injected material can be pressed around the pipeline behind the bead of the pipeline in a direction pointing away from the pipeline end, such that a shoulder can be formed which extends inwardly as far as the pipeline.

In this way, it is possible to prevent the pipeline from being able to be pulled out of the fitting. The injection-molded material pre-pressed against the elastic seal causes the seal to be axially compressed, such that the sealing action between the sleeve and the pipeline can be further intensified.

In one embodiment of the invention, the pushed-on sleeve has, in the region of the connecting ring, at least one encircling groove into which the material of the connecting ring engages. The connection of the connecting ring to the connector sleeve is in this way intensified by means of a positively locking component.

In one embodiment of the invention, the coupling fitting has a holder which is arranged at least partially in the region of the connecting ring, such that at least a part of the holder is embedded into the material of the connecting ring.

By means of this arrangement, a holder together with the connecting ring can be produced in one working step with the pipeline.

In one embodiment of the invention, that part of the holder which projects into the connecting ring has at least one through-hole which is filled with the injection-molded material.

This arrangement has the advantage that the holder can also be connected in positively locking fashion to the connecting ring.

The invention furthermore relates to a method for producing a coupling fitting, having a pipeline and having a connector sleeve.

In this case, the invention is based on the object of producing the connection discussed in the introduction so as to be secure and sealed in the simplest possible manner and with the least possible material usage, wherein undesired thermal loading of the components involved and of adjacent components is avoided.

The object is achieved in that the connection is made by the following working steps:

producing an encircling bead on the pipeline, wherein the bead is spaced apart from the end of the pipeline by a predetermined dimension;

pushing an elastic, ring-shaped seal onto the end of the pipeline such that the seal comes to lie between the bead and the end of the pipeline;

pushing a sleeve onto the end of the pipeline such that the first end of the sleeve comes to lie in the region of the bead of the pipeline and has a first inner diameter such that a gap is formed between the outer diameter of the bead and the first inner diameter of the sleeve, and the second end of which sleeve has a second inner diameter which corresponds to the inner diameter of the pipeline, and the first diameter transitions into the second diameter in a transition region between the bead and the end of the pipeline, such that the sleeve can be pushed onto the end of the pipeline only as far as a point at which the end of the pipeline fits no further into the second diameter of the sleeve;

encapsulating the assembly composed of pipeline end and sleeve to form a connecting ring in a region which is axially dimensioned such that the connecting ring covers the pushed-on first end of the sleeve both in the direction of the non-pushed-on second end of the sleeve and in the opposite direction by a predetermined dimension and is produced in a plastics injection-molding process, wherein the material of the connecting ring is, owing to the injection pressure, pressed through the gap as far as the elastic seal and, secondly, the injected material is pressed around the pipeline behind the bead of the pipeline in a direction pointing away from the pipeline end, such that a shoulder is formed which extends inwardly as far as the pipeline.

In this way, an inwardly pointing shoulder of the encapsulation forms behind the bead of the pipeline, which shoulder prevents the pipeline from being able to be pulled out of the fitting. The inflow of the injection-molded material against the elastic seal causes the seal to be axially compressed, such that the sealing action between the sleeve and the pipeline is further intensified.

In one embodiment of the invention, the pushed-on sleeve has, in the region of the encapsulation, at least one encircling groove into which the injection-molded material flows during the injection-molding process.

Thus, positive locking is generated between the sleeve and the solidified injection-molded material, which positive locking improves the reliability with which the sleeve and the pipeline are prevented from being pulled apart.

In one embodiment of the invention, the method furthermore comprises the following step:

arranging a holder in the region of the connecting ring to be encapsulated, in such a way that a part of the holder projects into the region in which injection molding is to be performed, and the part is encapsulated by the injection-molded material during the injection molding process.

This arrangement has the advantage that a holder does not have to be separately attached.

In one embodiment of the invention, that part of the holder which projects into the region in which injection molding is to be performed has at least one through-hole into which the injection-molded material ingresses during the injection molding process.

In this way, the holder is also connected in positively locking fashion to the connecting ring.

BRIEF DESCRIPTION OF THE DRAWING

The invention will now be described with reference to the single FIGURE of the drawing (FIG. 1) which shows a coupling fitting according to the invention in longitudinal section.

DESCRIPTION OF THE PREFERRED EMBODIMENTS OF THE INVENTION

In FIG. 1, the coupling fitting 1 has a pipeline 2 with an inner diameter 3 and has an end contour 4 and an encircling bead 5. The coupling 1 further includes a connector sleeve 6 with a first inner diameter 8 and a second inner diameter 7. The first inner diameter 8 is dimensioned such that a gap 9 exists between the encircling bead 5 and the connector sleeve 6. Between the end contour 4, the bead 5 and the inner diameter 8 of the connector sleeve 6, there is arranged an elastic ring seal 10 which seals off the pipeline 2 against the sleeve 6.

The sleeve 6 has an encircling groove 11 on its outer circumference. In the end region 12 of the sleeve 6, which end region is pushed onto the pipeline 2 over the bead 5, a connecting ring 13 composed of plastics material is injection-molded thereon. The connecting ring 13 completely covers the end region 12 of the sleeve 6 in an axial direction. The plastics material of the connecting ring 13 has, during the injection molding process, ingressed through the gap 9 into a cavity 14. The cavity 14 is formed by the elastic seal 10, the inner diameter 8 of the sleeve 6 and the pipeline 2. Owing to the injection-molding pressure, the seal 10 has been compressed slightly, which gives rise to an increase in the contact pressure of the seal 10 and thus an improvement of the sealing action. The connecting ring 13 furthermore engages around the outer circumference of the sleeve 6, wherein the material is also pressed into the groove 11. The connecting ring 13 furthermore extends around the end region 12 of the sleeve 6 such that, behind the end 12 of the sleeve 6 in the direction of the pipeline 2, the connecting ring 13 forms a shoulder 15 which extends as far as the pipeline 2. Here, the bead 5 is also enclosed or enveloped.

The connecting ring 13 thus prevents the inadvertent separation of sleeve 6 and pipeline 2 both in positively locking fashion, by engagement into the groove 11 and behind the bead 5, and by frictional engagement between the sleeve 6 and pipeline 2.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Description

1 Coupling fitting
2 Pipeline
3 Inner diameter of the pipeline 2
4 End contour of the pipeline 2
5 Encircling bead of the pipeline 2
6 Connector sleeve/sleeve
7 Second inner diameter of the sleeve 6
8 First inner diameter of the sleeve 6
9 Gap
10 Elastic ring seal/seal
11 Encircling groove of the sleeve 6

12 End region of the sleeve 6
13 Connecting ring
14 Cavity
15 Shoulder of the sleeve 6

What is claimed is:

1. A coupling fitting comprising:

a pipeline having an inner diameter and defining an end and an outwardly directed radial annular bead disposed at a predetermined distance from said end;

a connecting sleeve pushed onto said pipeline;

said connecting sleeve having a first end disposed in the region of said annular bead and an inner wall surface defining a first inner diameter dimensioned to cause said annular bead and said inner wall surface to conjointly define a gap therebetween;

said connecting sleeve further having a second end defining a second inner diameter which corresponds to said inner diameter of said pipeline;

a transition zone of said connecting sleeve is defined between said annular bead of the pipeline and said end of the pipeline;

wherein said first inner diameter of said connecting sleeve transitions from said first inner diameter at said second end to said second inner diameter of said first end of said connecting sleeve to permit said connecting sleeve to be pushed onto said pipeline only so far until said end of said pipeline does not fit any farther into said second diameter of said connecting sleeve;

an annular cavity between a said inner wall surface of said connecting sleeve and an outer surface of said pipeline;

an elastic annular seal disposed in said annular cavity;

an injection molded connecting ring made of plastics material disposed in a region of said coupling fitting which is axially dimensioned so as to permit said injection molded connecting ring to cover over said first end of said connecting sleeve both in a first direction toward said second end of said connecting sleeve as well as in a second direction opposite said first direction to a predetermined dimension; and, the plastics material, because of injection pressure, extending through said gap into said annular cavity up to said elastic annular seal and extending from behind said annular bead in a direction away from said end of said pipeline so as to form a shoulder extending inwardly to said pipeline.

2. The coupling fitting of claim 1, wherein said connecting sleeve has at least one annular groove into which said plastics material of said connecting ring engages.

3. The coupling fitting of claim 1, wherein the injection molded connecting ring completely covers the first end of the connecting sleeve.

4. The coupling fitting of claim 1, wherein the injection molded connecting ring is configured to compress the elastic annular seal.

5. The coupling fitting of claim 1, wherein the injection molded connecting ring engages around an outer circumference of the connecting sleeve.

6. The coupling fitting of claim 5, wherein the injection molded connecting ring further engages an annular groove behind a bead of the said pipeline.

7. The coupling fitting of claim 6, wherein the injection molded connecting ring is configured to positively lock the annular groove behind the bead.

* * * * *